United States Patent [19]
Bodart et al.

[11] 4,249,254
[45] Feb. 3, 1981

[54] ARRANGEMENT FOR RESTITUTING SELECTION SIGNALS

[75] Inventors: Robert Bodart; Jean P. A. R. J. Werts, both of Brussels, Belgium

[73] Assignee: U.S. Philips Corporation, New York, N.Y.

[21] Appl. No.: 8,804

[22] Filed: Feb. 2, 1979

[51] Int. Cl.³ .......................................... H04L 25/38
[52] U.S. Cl. ...................................... 375/117; 370/48
[58] Field of Search ................... 178/53.1 R, 53.1 A, 178/69.1; 179/15 A; 307/231, 236; 328/108, 118; 364/700, 701, 715; 375/117, 114; 370/47, 48

[56] References Cited

U.S. PATENT DOCUMENTS

| | | | |
|---|---|---|---|
| 3,502,808 | 3/1970 | Brown, Jr. | 178/53.1 R |
| 4,048,440 | 9/1977 | Peck et al. | 178/53.1 R |
| 4,087,640 | 5/1978 | Sato | 179/15 A |

*Primary Examiner*—Benedict V. Safourek
*Attorney, Agent, or Firm*—Thomas A. Briody; William J. Streeter; Edward W. Goodman

[57] ABSTRACT

Arrangement for restituting selection signals from a received isochronous signal which permits an ample variation in the number of consecutive bits of start polarity A and stop polarity Z, which represent respective values of the selection signals. This arrangement can handle 2, 3 or 4 bits A and 1,2 or 3 bits Z and restitute therefrom the intervals of stop polarity Z with a fixed duration and the intervals of start polarity A with a variable duration between two limits.

1 Claim, 2 Drawing Figures

ARRANGEMENT FOR RESTITUTING SELECTION SIGNALS

BACKGROUND OF THE INVENTION (1) Field of the Invention

The invention relates to an arrangement for restituting selection signals from a received isochronous signal, the binary signal elements A and Z of which represent the sampling values of the selection signals, the sampling values having been taken at sampling instants having a given position relative to the signal transitions in the selection signals, in which the isochronous signal is applied to a buffer receiving store.

The invention has application in the field of code and speed dependent multiplexing of start-stop telegraph signals and the associated selection signals, those of the CCITT B-type signaling in particular.

In this B-type signaling the selection signals may be constituted by dial pulses having a pulse duration-pulse interval ratio (nominal 60/40) located between given limits.

In accordance with CCITT recommendation R101 (reference D1) the dial pulses in the isochronous signal are represented by 2, 3 or 4 bits A and at least one bit Z. (A: start polarity; Z: stop polarity).

A (2) Description of the Prior Art

In accordance with reference D1 the dial pulses coming from the isochronous signal must be restituted in accordance with CCITT recommendation U2 (reference D2).

In accordance with this latter recommendation the characteristics of the dial pulses may vary between the limits indicated herebelow:
rate: 9–11 pulses/sec
Z:A ratio 1:1,2 to 1:1,9

From this it can be derived that:
interval of polarity A:49.6–72.8 ms
interval of polarity Z:31.4–50.5 ms These requirements can be satisfied by restituting the intervals of stop polarity Z with a fixed duration of 41 ms and by restituting the intervals of start polarity A with a variable duration between upper and lower limits of 50 and 70 ms.

The variations in the received plurality of bits A and Z are then compensated for by having the duration of the intervals of stop polarity A vary. This will require the use of a buffer store storing the received bits A and Z, while the signals with measured intervals of polarity A and Z are applied to the output for the restituted signals.

SUMMARY OF THE INVENTION

It is an object of the invention to provide an arrangement comprising a buffer store for restituting selection signals from a received isochronous signal which permits an ample variation in the number of consecutive bits A and Z, which represent respective values of the selection signals in the isochronous signal. In particular such an arrangement can cater for 2, 3 or 4 bits A and 1, 2 or 3 bits Z, and restitutes therefrom selection signals which satisfy CCITT recommendation U2, for example by restituting the intervals of stop polarity Z with a fixed duration (of 41 ms) and the intervals of start polarity A with a variable duration between two limits (of 50 and 70 ms).

The arrangement according to the invention is characterized in that after the occurrence of a Z-A transition at the output of the receiving store, A-polarity is applied for at least a predetermined period to the output for the selection signal, that after this period has elapsed the A-polarity is replaced by Z-polarity if a signal element Z is present at the output of the receiving store, that otherwise the supply of A-polarity to the output for the selection signal is continued to a predetermined maximum period or until the signal element combination ZZA or AZA is detected in the receiving store, considered from the output thereof, depending on which condition is satisfied first, that on continuation to the predetermined period the signal elements in the receiving store are shifted relative to the output over one or two positions until a signal element Z appears at the output and that at the previously mentioned detection of the signal element combination ZZA or AZA the signal elements are shifted one position causing the signal element Z to appear at the output, that thereafter during a fixed period Z-polarity is applied to the output for the control signal, and after expiration of that fixed period the signal elements in the receiving store are shifted relative to the output thereof for zero, one or two positions until a signal element A appears at the output whereafter the cycle is repeated and, otherwise, Z-polarity is applied to the output for the control signal until a signal element A appears at the output of the receiving store whereafter the cycle is repeated.

SHORT DESCRIPTION OF THE FIGURES

REFERENCES

D1: CCITT recommendation R101.
D2: CCITT recommendation U2.

DESCRIPTION OF AN EMBODIMENT

Figure 1:
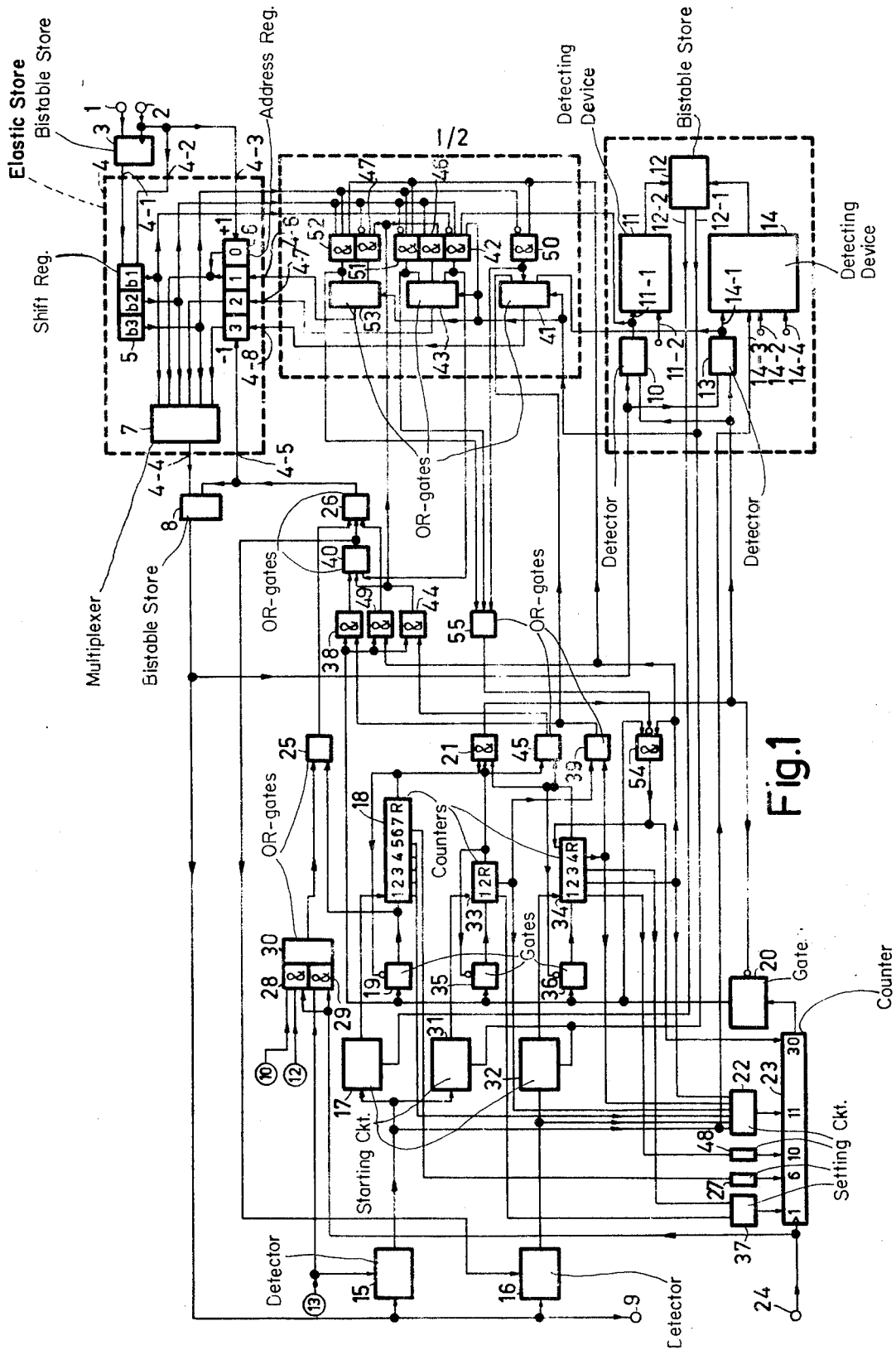
FIG. 1 shows a block diagram of an arrangement according to the invention.

E (1) The block diagram shown in FIG. 1

Referring to FIG. 1, it is assumed that an isochronous signal for one channel in conformity with reference D1 is received at a signal input 1 and a corresponding clock pulse signal is received at a clock input 2. The transmission rate is assumed to be 50 Baud. The isochronous signal has a somewhat higher rate, namely 48/47·50 Baud corresponding to an element duration of 19 7/12 ms, in accordance with reference D1.

On receipt the bits of the isochronous signal are stored in the bistable store 3. The output of this store is connected to input 4-1 of the elastic store 4 and the clock signal is applied to inputs 4-2 and 4-3. The clock signal applied to input 4-2 controls the writing of the information bits into the shift register 5 which comprises three stages b1, b2 and b3.

The information bits are always entered into the first stage b1 of the shift register 5 and each clock pulse at the input 4-2 shifts the bits from one stage to the next.

The information bits are read from stage b1, b2 or b3 under the control of an address register 6 and by means of a multiplexer 7. The bit which has been readout appears at an output 4-4 after a clock pulse has been applied to an input 4-5.

The multiplexer 7 receives the three bits from the shift register 5 and control signals from the address register 6, which indicate which bit must be selected.

The address register 6 is in the form of a linear counter consisting of four stages (0, 1, 2, 3) the outputs of the first two stages (0, 1) being combined to one output. The outputs of this counter supply the control signals for multiplexer 7.

A binary "1" is present in one of the stages of address register 6. A clock pulse at input 4-3 shifts the binary "1" one position to the left but no further than to the last stage (3). A clock pulse at input 4-5 shifts the binary "1" one position to the right but not further than to the first stage (0).

In the quiescent state clock pulses of a relatively high frequency (1 kHz) are applied to clock input 4-5. The result thereof is that in the quiescent state the bit of stage b1 of the shift register 5 always appears at output 4-4.

The buffer store 4 also comprises setting inputs 4-6, 4-7 and 4-8 with direct access to the stages (1), (2) and (3) of address register 6. Setting signals applied to these inputs can immediately set the address register to a given state.

The output 4-4 is connected to a bistable store 8 to which also the clock signal applied at input 4-5 is applied. The output of the bistable store constitutes the output 9 of the arrangement of FIG. 1.

In the quiescent state of the arrangement a signal having the polarity of the bit in stage b1 of shift register 5 appears at output 9.

If start polarity A occurs for more than 230 ms at output 9 this means that the connection is disconnected and, in addition, the start of the so-called "signaling phase."

A detector 10, for detecting the quiescent state with start polarity A, is connected to the output 9. The output of detector 10 is connected to an input 11-1 of a device 11 which is for detecting the start of the signaling phase. A second input 11-2 of the device 11 is connected to the output of a corresponding device in the transmitter (not shown), which is associated with the other direction of signal transmission.

If device 11 detects that polarity A is transmitted for 230 ms in either signal direction, the bistable store 12 is set to the "signaling phase" state, wherein a signal is applied therefrom to an output 12-1.

The signaling phase terminates at the occurrence of a stop-start transition in one signal direction, while constant stop polarity Z is being transmitted in the other signal direction.

A detector 13 is connected to the output 9 for detecting the quiescent state with stop polarity Z.

The Z-A and A-Z transitions are detected by respective detectors 15 and 16 connected to output 9.

A device 14 for detecting the end of the signaling phase (=start of the information phase) receives:
at input 14-1 the output signal of detector 13,
at input 14-2 the output signal of a corresponding detector in the transmitter which is associated with the other direction of signal transmission,
at input 14-3 the output signal of detector 15,
at input 14-4 the output signal of a corresponding detector in the transmitter which is associated with the other direction of signal transmission.

If the device 14 detects a Z-A transition in one direction of signal transmission while constant Z-polarity is being transmitted into the other direction of signal transmission, the bistable store 12 is reset to the state "information phase" in which a signal is applied therefrom to an output 12-2.

In the information phase, in which telegraph characters of $7\frac{1}{2}$ units (6 elements of 20 ms and a stop element of 30 ms) are transmitted, bistable store 12 activates a starting circuit 17 which is associated with a sampling instant counter 18. When activated, starting circuit 17 becomes sensitive to an output signal from detector 15, which output signal indicates a detected Z-A transition.

After the detection of a Z-A transition by detector 15, the starting circuit 17 adjusts the counter 18 to counting position number 1 whereby a blocking signal for gate 19 is removed and gate 20 is released via AND-gate 21. Simultaneously, detector 15 adjusts a counter 23 to counting position number 11 via a setting circuit 22. This counter 23 is supplied with clock pulses having a repetition rate of 1 kHz from a clock input 24. The counter 23 has thirty counting positions and, after the counter has been adjusted to counting position number 11, it takes 20 clock pulses before the counter switches from counting position number 30 to counting position number 1. This switching is accompanied by a clock pulse applied via the gates 20 and 19 to the counter 18, and to the clock input 4-5 of the buffer store 4 and the bistable store 8 via the OR-gates 25 and 26.

As a result of this clock pulse a bit is read from the buffer store 4 and entered into the bistable store 8.

Continuing in this way, the buffer store 4 is read at instants which are shifted 20, 40, 60, 80, 100, 120 and 145 ms, respectively, relative to the Z-A transition which starts the sampling process. This is the normal sampling process for telegraph characters. The time duration of 25 ms after the sampling instant of 120 ms is measured by adjusting at that instant counter 23 to counting position number 6 via setting circuit 27. For the other sampling instants, the setting circuit 22 is always used.

After the seventh sampling pulse the counter 18 is in the quiescent state R, which causes gate 19 to close. The sampling process for one character is then terminated and a new sampling process can start after detection of a next Z-A transition.

The clock pulses of input 24 are combined in an AND-gate 28 with the output signals of the detector 10 and the output 12-1 of the bistable store 12.

The clock pulses at input 24 are also combined in an AND-gate 29 with the output signal of detector 13.

The output signals of the AND-gates 28 and 29 are combined by an OR-gate 30 and applied via the OR-gates 25 and 26 to the clock input 4-5. The result is that the buffer store 4 is read with a relatively high frequency if constant A- or Z-polarity is received in the information phase and if constant Z-polarity is received in the signaling phase. This achieves that stage b1 continues to supply the output signal so that a signal transition initiating a sampling process is quickly detected after receipt.

It should be noted that the detector 15 is only sensitive if the detector 13 supplies an output signal so that Z-A transitions are only detected after a preceding period of constant Z-polarity.

For the description to follow, it will be assumed that the bistable store 12 indicates the signaling phase (signal at output 12-1) and that initially constant Z-polarity is received followed by a dial pulse series, stage b3 of the shift register 5 supplying the output signal.

As described previously, the buffer store 4 is read with a high speed and detector 15 is activated. The bistable store 12 furthermore activates the starting circuits 31 and 32 associated respectively with the counters 33 and 34 which serve, respectively, for controlling a reduced sampling process with two sampling instants and an inverse sampling process with four sampling instants. Starting circuit 31 is connected to the detector 15 for response to the Z-A transitions and starting circuit 32 is connected to the detector 16 for response to the A-Z transitions.

If a Z-A transition is detected, starting circuit 31 adjusts counter 33, for the reduced sampling process, to counting position number 1, so a blocking signal for a gate 35 is removed and the blocking signal for gate 20 from AND-gate 21 is also removed. Simultaneously the output signal of detector 15 has adjusted counter 23 to counting position number 11 via setting circuit 22.

The result is that counter 23 adjusts counter 33 to counting position number 2, via the gates 20 and 35, 20 ms after the Z-A transition. Simultaneously counter 23 is adjusted to counting position number 1 via a setting circuit 37.

The result is that counter 23 supplies a sampling pulse 30 ms later, that is to say 50 ms after the Z-A transition, which sampling pulse adjusts counter 33 to the quiescent state R via the gates 20 and 35. Simultaneously counter 23 is adjusted to counting position number 11 via the setting circuit 22 and then supplies, 20 ms later, an output pulse, unless the bit combination ZZA or AZA is detected in the buffer store 4 as will be described.

In an AND-gate 38, the output signal of gate 20 is combined with counting position number 2 of counter 33 via an OR-gate 39. The output signal of AND-gate 38 is applied to the clock input 4-5 of the buffer store 4 via the OR-gates 40 and 26.

The result is that the sampling pulse occurring at 50 ms after the Z-A transition functions as a readout pulse for the buffer store 4.

Furthermore, the output signal of AND-gate 38 is applied via the OR-gate 40 to the detector 16 to render the latter responsive.

Counting position number 2 of the counter 33 causes the address register 6 to be set to position number 3 via the OR-gates 39 and 41, causing the bit in stage b3 of shift register 5 to be read 50 ms after the Z-A transition.

If the above bit in stage b3 is a Z-bit, detector 16 will detect an A-Z transition after read-out, so that another sampling process is started.

The output signal at output 12-1 of the bistable store 12 is combined in an AND-gate 42 with the output signal of detector 10, and the output signal of stage b2 and the inverse output signal of stage b1 of shift register 5. The output signal of the AND-gate 42 is applied to control input 4-7 via an OR-gate 43 and to clock input 4-5 via the OR-gates 40 and 26.

As a result, if the bistable store 8 continues to supply A-polarity 50 ms after the Z-A transition and stage b2 comprises a bit Z and stage b1 a bit A, the bit Z in stage b2 is read out. As a consequence thereof, detector 16 will detect an A-Z transition. This means that the period having polarity A is terminated as soon as it is detected that the bit combination ZA is present in the stages b2, b1.

If in the stages b3, b2, b1 the combination ZZA or AZA is present, the period having polarity A is not made longer than strictly necessary to satisfy the transmission standards.

An AND-gate 44 combines the quiescent state of counter 33 or 34 (via an OR-gate 45) with the output signal of gate 20. The output signal of AND-gate 44 is applied to clock pulse input 4-5 via the OR-gates 40 and 26.

An AND-gate 46 combines the output signal of AND-gate 44 with the output signal of stage b2 of shift register 5.

An AND-gate 47 combines the output signal of AND-gate 44 with the inverse output signal of stage b2 of shift register 5.

The output signals of the AND-gates 46 and 47 are applied to the resetting inputs 4-7 and 4-6 via OR-gates 43 and 53, respectively.

The result is that if A-polarity is still present at output 9 70 ms after the Z-A transition, the bit in stage b2 is read out if this bit is a Z-bit and the bit in stage b1 is read out if the bit in stage b2 is an A-bit.

The result is that after 70 ms the polarity at output 9 changes in any case from A-polarity into Z-polarity.

The corresponding A-Z transition will be detected by detector 16.

After detection of the A-Z transition, the starting circuit 32 adjusts the counter 34 for the inverse sampling process to counting position number 1, so that gate 36 becomes conducting. Simultaneously the output signal of the detector 16 adjusts counter 23 to counting position number 11 via the setting circuit 22.

The result is that the counter 23 supplies an output pulse 20 ms later which adjusts the counter 34 to counting position number 2 via the gates 20 and 36. Simultaneously, the counter 23 is adjusted to counting position number 10 via a setting circuit 48.

The result is that 21 ms later, that is to say 41 ms after the A-Z transition, the counter 23 supplies an output pulse which adjusts the counter 34 to counting position number 3 via the gates 20 and 36. Simultaneously, the counter 23 is adjusted to counting position number 11 via the setting circuit 22.

An AND-gate 49 combines counting position number 2 of the counter 34 with the output signal of the gate 20. The output signal of the AND-gate 49 is applied via the OR-gate 26 to clock input 4-5.

An AND-gate 50 combines counting position number 2 of the counter 34 with the inverse output signal of stage b3 of shift register 5. The output signal of the AND-gate 50 is applied to setting input 4-8 via the OR-gate 41.

An AND-gate 51 combines counting position number 2 of the counter 34 with the output signal of stage b3 of shift register 5 and the inverse output signal of stage b2 of shift register 5. The output signal of the AND-gate 51 is applied to setting input 4-7 via the OR-gate 43.

An AND-gate 52 combines counter position number 2 of the counter 34 with the output signal of the stages b2 and b3 of shift register 5. The output signal of the AND-gate 52 is applied to setting input 4-6 via the OR-gate 53.

The result is that 41 ms after the A-Z transition, the stage b3, b2 or b1 of shift register 5 is read by the output pulse of counter 23 depending on where an A-bit is found first. Reading an A-bit at output 9 is accompanied by a Z-A transition. If no A-bit is read, the Z-bit of stage b1 is read out in the following manner.

An AND-gate 54 combines counting position number 2 of counter 34 with the output signal of gate 20 and the inverse output signal of an OR-gate 55, which latter combines the output signals of the AND-gates 50, 51 and 52. The output signal of the AND-gate 54 is applied to a resetting input of the counter 34 and of the counter 23.

The result is that 41 ms after the A-Z transition, the counter 34 is adjusted to the quiescent state R and the counter 23 to position number 30, if a bit A is not present in any of the stages of shift register 5. Thereafter the buffer store 4 is read out again at a high speed, stage b1 supplying the output signal.

Assuming that 41 ms after the A-Z transition a bit A is present in the buffer store 4, a Z-A transition occurs at output 9 and the counter 23 supplies, 20 ms thereafter, an output pulse which adjusts the counter 34 to counting position number 4 via the gates 20 and 36. Simultaneously, the counter 23 is adjusted to counting position number 1 via the setting circuit 37, causing an output pulse to occur 30 ms later, that is to say 50 ms after the Z-A transition.

This output pulse adjusts the counter 34 via the gates 20 and 36 to the quiescent state R. The AND-gate 38 combines the output signal of gate 20 with counting position number 4 of counter 34 via the OR-gate 39. The output signal of the AND-gate 38 is applied to clock input 4-5 via the OR-gates 40 and 26. Consequently the output pulse of the counter 23 will also function as the read pulse of the buffer store 4.

The state of the receiver is now exactly the same as 50 ms after detection of the first Z-A transition and the receiver will now function in exactly the same manner.

Each dial pulse will be restituted in the above described manner with periods of A-polarity varying between 50 ms and 70 ms and fixed periods of Z-polarity having a duration of 41 ms.

(2) THE FLOW DIAGRAM OF THE RECEIVER (FIG. 2)

Figure 2:
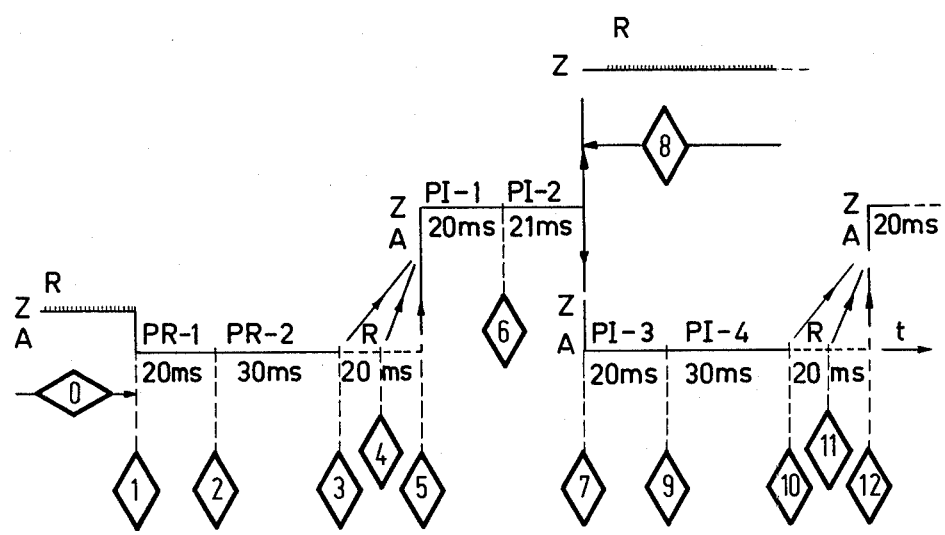
FIG. 2 shows the flow diagram of the arrangement according to the invention.

In FIG. 2, PR-1, PR-2 denote the first and second phase of the reduced sampling process (PR) controlled by the counter 23.

PI-1, PI-2, PI-3, PI-4 are the first, second, third and fourth phase of the inverse sampling process (PI) controlled by the counter 34.

In general R denotes the quiescent state.

The following explanation of functions and states of the receiver in time sequence are associated with the numbered diamonds. The functions are, as usual, described in the form of (macro) instructions indicating which functions must be performed. The equipment is arranged for performing these instructions.

It should be noted that such a time sequence of functions and associated states of the receiver can be realized in universal sequential programmable logic circuits such as normal trade micro-processors with associated stores and peripheral equipment, for example the Signetics 2650.

| function | description | |
|---|---|---|
| -0- | quiescent state with Z-polarity | |
| | counters (PR and PI) in quiescent state | (33,34) |
| | set address register to position no. 3 | (6) |
| | read buffer store with a high speed | (4) |
| | make detector responsive to Z-A transition | (15) |
| -1- | detection of transition Z-A | (15) |
| | set counter (PR) to position no 1 | (33) |
| | set frequency divider to position no. 11 | (23) |
| -2- | frequency divider supplies output pulse | (23) |
| | set counter (PR) to position no. 2 | (33) |
| | set frequency divider to position no. 1 | (23) |
| -3- | frequency divider supplies output pulse | (23) |
| | set address register to position no. 3 | (6) |
| | read buffer store (stage b3) | (4) |
| | set counter (PR) to quiescent state R | (33) |

-continued

| function | description | |
|---|---|---|
| | set frequency divider to position no. 11 | (23) |
| | make detector responsive for A-Z transition | (16) |
| | - if the bit in stage b3 is a Z-bit: | |
| | detection of transition A-Z | (16) |
| | set counter (PI) to position no. 1 | (34) |
| -4- | quiescent state with A-polarity | |
| | - if the bit in stage b2 is a Z-bit and the bit in stage b1 an A-bit: | (42) |
| | set address register to position no. 2 | (6) |
| | read buffer store (stage b2) | (4) |
| | detection of transition A-Z | (16) |
| | set counter (PI) to position no. 1 | (34) |
| | set frequency divider to position no. 11 | (23) |
| -5- | frequency divider supplies output pulse | (23) |
| | - if the bit in stage b2 is a Z-bit: | (46) |
| | set address register to position no. 2 | (6) |
| | - if the bit in stage b2 is an A-bit: | (47) |
| | set address register to position no. 1 | (6) |
| | read buffer store (stage b2 or b1) | (4) |
| | detection of transition A-Z | (16) |
| | set counter (PI) to position no. 1 | (34) |
| | set frequency divider to position no. 11 | (23) |
| -6- | frequency divider supplies output pulse | (23) |
| | set counter (PI) to position no. 2 | (34) |
| | set frequency divider to position no. 10 | (23) |
| -7- | frequency divider supplies an output pulse | (23) |
| | - if the bit in stage b3 is an A-bit: | (50) |
| | set address register to position no. 3 | (6) |
| | - if the bit in stage b3 is a Z-bit and the bit in stage b2 an A-bit: | (51) |
| | set address register to position no. 2 | (6) |
| | - if the bit in stage b3 and the bit in stage b2 is a Z-bit: | (52) |
| | set address register to position no. 1 | (6) |
| | read buffer store (stage b3, b2 or b1) | (4) |
| | set counter (PI) to position no. 3 | (34) |
| | set frequency divider to position no. 11 | (23) |
| | -if the bit in stage b3, the bit in stage b2 and bit in stage b1 is a Z-bit: | (55) |
| | set counter (PI) to the quiescent state R | (34) |
| | set frequency divider to position no. 30 | (23) |
| -8- | the same as -0- | |
| -9- | frequency divider supplies output pulse | (23) |
| | set counter (PI) to position no. 4 | (34) |
| | set frequency divider to position no. 1 | (23) |
| -10- | frequency divider supplies output pulse | (23) |
| | set counter (PI) to quiescent state R | (34) |
| | proceed from here as for -3- | |
| -11- | proceed as for -4- | |
| -12- | proceed as for -5- | |

What is claimed is:

1. In a system for restituting control signals from an isochronous signal, the binary signal of elements of start polarity A and stop polarity 2 of which represent the sampling values having been taken at sampling instants which have a given position relative to the signal transitions in the control signals, said system including a buffer receiving store to which the isochronous signal is applied, the method comprising:

a. detecting a Z-A transition at the output of said receiving store;
   b. applying A-polarity for at least a first predetermined period to the system output as the control signal upon detection of said Z-A transition in step a;
   c. detecting the polarity of the output of said receiving store after said first predetermined period;
   d. if Z-polarity is detected in step c, replacing the A-polarity, being applied to the system output, with Z-polarity until a signal element A appears at the output of the store whereupon the cycle from step a is repeated;

e. if Z-polarity is not detected in step c, continuing the application of A-polarity to the system output for a maximum of a second predetermined period of time;

f. detecting the occurrence of the signal combination ZZA or AZA in the output of said receiving store when said second predetermined period is initiated in step e;

g. if said second predetermined period expires prior to the detection of step f, shifting the signal elements in the receiving store relative to the output thereof over one or two positions until a signal element Z is detected at the output of the receiving store;

h. if said detection of step f occurs prior to the expiration of said second predetermined period, shifting the signal elements in the receiving store relative to the output thereof over one position causing the signal element Z to appear at the output of the store;

i. applying Z-polarity to the system output for a third predetermined period of time; and j. after said third predetermined period shifting the signal elements in the receiving store relative to the output thereof for zero, one or two positions until a signal element A appears at the output of the receiving store whereupon the cycle from step a is repeated.

* * * * *

UNITED STATES PATENT AND TRADEMARK OFFICE
CERTIFICATE OF CORRECTION

PATENT NO. : 4,249,254
DATED : February 3, 1981
INVENTOR(S) : ROBERT BODART ET AL It is certified that error appears in the above—identified patent and that said Letters Patent is hereby corrected as shown below:

Claim 1, Column 8, Line 49 delete "of" (first occurrence)

Claim 1, Column 8, Line 50 change "2" to --Z--

Signed and Sealed this

Eleventh Day of January 1983

[SEAL]

Attest:

GERALD J. MOSSINGHOFF

Attesting Officer    Commissioner of Patents and Trademarks